(12) United States Patent
Wu et al.

(10) Patent No.: US 10,481,646 B2
(45) Date of Patent: Nov. 19, 2019

(54) COMPUTER CABINET

(71) Applicant: COOLER MASTER TECHNOLOGY INC., New Taipei (TW)

(72) Inventors: Chih-Wen Wu, New Taipei (TW); Chia-Hsiang Chi, New Taipei (TW); Kuei-Yun Feng, New Taipei (TW)

(73) Assignee: Cooler Master Technology Inc., New Taipei (TW)

( * ) Notice: Subject to any disclaimer, the term of this patent is extended or adjusted under 35 U.S.C. 154(b) by 0 days.

(21) Appl. No.: 15/605,218

(22) Filed: May 25, 2017

(65) Prior Publication Data

US 2018/0299930 A1  Oct. 18, 2018

(30) Foreign Application Priority Data

Apr. 14, 2017  (CN) .......................... 2017 1 0244904

(51) Int. Cl.
*G06F 1/18* (2006.01)
(52) U.S. Cl.
CPC .................................. *G06F 1/181* (2013.01)
(58) Field of Classification Search
CPC ...................................................... G06F 1/181
See application file for complete search history.

(56) References Cited

U.S. PATENT DOCUMENTS

| 5,941,617 | A | * | 8/1999 | Crane, Jr. | ................. | B44C 5/04 |
| | | | | | | 312/204 |
| 2005/0135075 | A1 | * | 6/2005 | Deng | ...................... | G06F 1/181 |
| | | | | | | 361/797 |
| 2006/0187627 | A1 | * | 8/2006 | Kobayashi | .............. | G06F 1/181 |
| | | | | | | 361/679.37 |
| 2008/0001508 | A1 | * | 1/2008 | Cheng | ..................... | G06F 1/181 |
| | | | | | | 312/223.2 |
| 2009/0034220 | A1 | * | 2/2009 | Mariano | ................. | G06F 1/181 |
| | | | | | | 361/801 |
| 2009/0241607 | A1 | * | 10/2009 | Farrow | ................. | E05B 65/006 |
| | | | | | | 70/58 |
| 2009/0284109 | A1 | * | 11/2009 | Lee | .......................... | G06F 1/181 |
| | | | | | | 312/223.2 |
| 2010/0053869 | A1 | * | 3/2010 | Sun | ......................... | G06F 1/181 |
| | | | | | | 361/679.6 |
| 2010/0102687 | A1 | * | 4/2010 | Chang | ..................... | G06F 1/181 |
| | | | | | | 312/223.1 |
| 2010/0188812 | A1 | * | 7/2010 | Morrison | ............. | F16M 11/041 |
| | | | | | | 361/679.58 |

(Continued)

*Primary Examiner* — Hanh V Tran
(74) *Attorney, Agent, or Firm* — McDermott Will & Emery LLP

(57) ABSTRACT

A computer housing including a plurality of panels including a front panel, a top panel, a rear panel, a bottom panel, a left panel, and a right panel coupled together to form the computer housing. The computer housing also includes a beveled portion disposed between at least one of (i) the front panel and the top panel, (ii) the top panel and the rear panel, (iii) the rear panel and the bottom panel, and (iv) the bottom panel and the front panel, and at least two engagement members disposed in each corner of the computer housing. At least one engagement member is disposed in the beveled portion and the at least two engagement members are disposed at a same distance from each other in each corner. The computer housing further includes a supporting member removably attached to each beveled portion.

24 Claims, 17 Drawing Sheets

(56) References Cited

U.S. PATENT DOCUMENTS

| | | | | |
|---|---|---|---|---|
| 2011/0122576 A1* | 5/2011 | Kuo | ................. | G06F 1/181 |
| | | | | 361/679.58 |
| 2011/0297414 A1* | 12/2011 | Chen | ................. | G06F 1/181 |
| | | | | 174/50 |
| 2012/0099271 A1* | 4/2012 | Hsu | ................. | G06F 1/181 |
| | | | | 361/679.58 |
| 2013/0234571 A1* | 9/2013 | Cheng | ................. | G06F 1/181 |
| | | | | 312/223.2 |
| 2015/0035421 A1* | 2/2015 | Hsiung | ................. | G06F 1/181 |
| | | | | 312/265.5 |
| 2015/0138719 A1* | 5/2015 | Zhu | ................. | G06F 1/20 |
| | | | | 361/679.33 |
| 2016/0105976 A1* | 4/2016 | Xiao | ................. | G06F 1/181 |
| | | | | 361/679.01 |
| 2016/0255300 A1* | 9/2016 | Ritter | ................. | G06F 1/16 |
| | | | | 361/752 |
| 2017/0048998 A1* | 2/2017 | Lee | ................. | G06F 1/16 |
| 2017/0060196 A1* | 3/2017 | Chen | ................. | G06F 1/186 |
| 2017/0064842 A1* | 3/2017 | Dernier | ................. | H05K 5/0013 |

* cited by examiner

COMPUTER CABINET

CROSS-REFERENCE TO RELATED APPLICATIONS

This non-provisional application claims priority under 35 U.S.C. § 119 to Chinese Patent Application Serial No. CN201710244904.2, filed on Apr. 14, 2017, in the State Intellectual Property Office (SIPO) of the People's Republic of China (PRC), the disclosure of which is hereby incorporated by reference in its entirety.

BACKGROUND

Field

Embodiments disclosed are related to computer cabinets or housings, and more particularly, to a computer housing having removable components such as panels, handles, supports for changing appearance of the housing.

Description of Related Art

It is generally desirable to provide a computer housing with an aesthetically pleasing appearance. Computer housings having removable panels for changing appearance of the housing currently exist. However, removing the panels is a time-consuming process. Further, handles, supports, and other components of the existing computer housings cannot be changed.

SUMMARY

Various aspects of the present disclosure provide a computer housing having removable components for changing appearance of the housing.

According to one aspect of the present disclosure, the computer housing includes a plurality of panels including a front panel, a top panel, a rear panel, a bottom panel, a left panel, and a right panel coupled together to form the computer housing. The computer housing also includes a beveled portion disposed between at least one of (i) the front panel and the top panel, (ii) the top panel and the rear panel, (iii) the rear panel and the bottom panel, and (iv) the bottom panel and the front panel, and at least two engagement members disposed in each corner of the computer housing. At least one engagement member is disposed in the beveled portion and the at least two engagement members are disposed at a same distance from each other in each corner. The computer housing further includes a supporting member removably attached to each beveled portion.

According to another aspect of the present disclosure, the computer housing includes a plurality of panels including a front panel, a top panel, a rear panel, a bottom panel, a left panel, and a right panel coupled to each other to form the computer housing. At least one of (i) the front panel and the top panel, (ii) the top panel and the rear panel, (iii) the rear panel and the bottom panel, and (iv) the bottom panel and the front panel define an edge of the computer housing therebetween, and at least two engagement members are disposed on each of the front panel, the top panel, the rear panel, the bottom panel. Each engagement member is disposed at a same distance from a corresponding edge. The computer housing further includes a supporting member removably attached proximate each edge on the top panel and the bottom panel.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Embodiments described herein are directed to a computer housing having removable components for changing an appearance thereof as desired by a user.

Figure 1A:
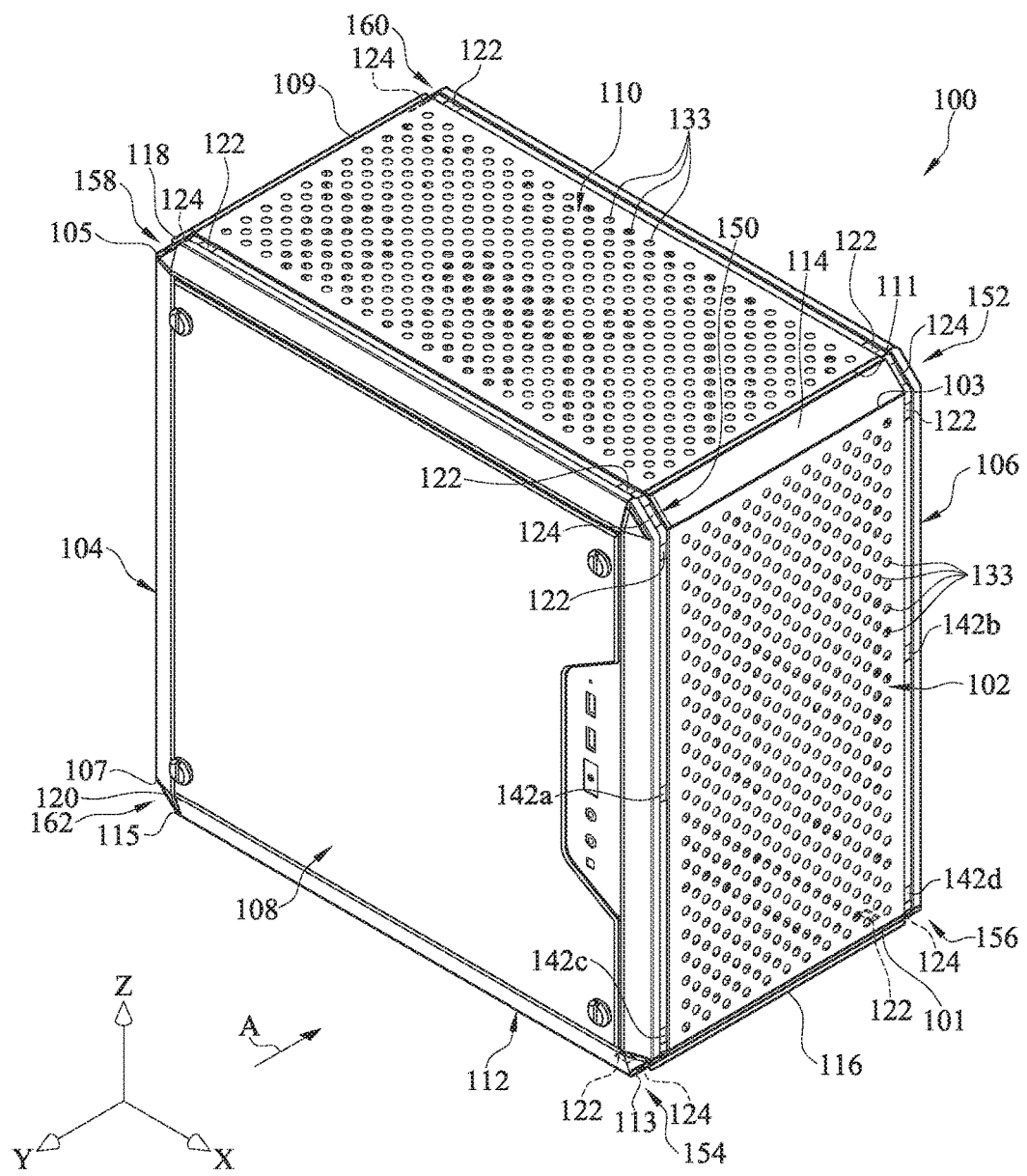
FIG. 1A is a left perspective view of a computer housing having beveled portions, according to disclosed embodiments.
Figure 1B:
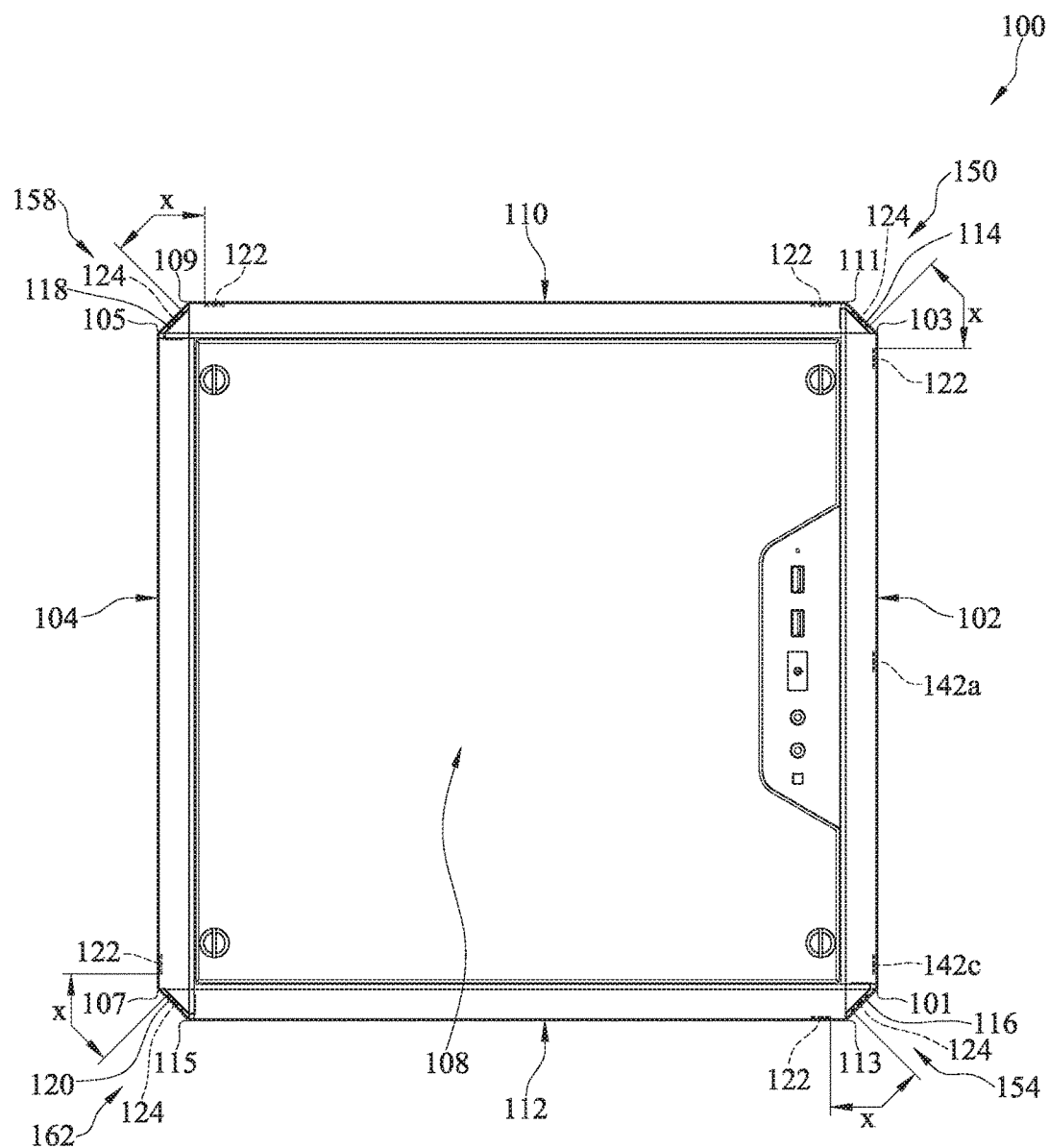
FIG. 1B is a left side view of the computer housing of FIG. 1A as viewed in the direction of the arrow A in FIG. 1A.

FIG. 1A is a left perspective view of a computer housing 100, according to disclosed embodiments. FIG. 1B is a left side view of the computer housing 100 as viewed in the direction of the arrow A.

A frame of reference defined by a longitudinal axis X, a lateral axis Y, and a vertical axis Z may be used for the purposes of describing the computer housing 100. As used herein, the terms vertical, horizontal, upper, lower, left, right, front, and rear are with reference to an illustrative embodiment as depicted in FIGS. 1A and 1B, which illustrate a normal operating position of the computer housing 100. Referring to FIGS. 1A and 1B, the computer housing 100 may include a vertically and laterally extending front panel 102, a vertically and laterally extending rear panel 104 opposite the front panel 102, a vertically and longitudinally extending right panel 106 (hidden in FIG. 1B), a vertically and longitudinally extending left panel 108 opposite the right panel 106, a longitudinally and laterally extending top panel 110, and a longitudinally and laterally extending bottom panel 112 opposite the top panel 110. As discussed below, the appearance of each panel 102, 104, 110, and 112 may be customized. The panels 102, 104, 110, and 112 have the same shape and size and each may define a plurality of holes 133. The holes 133 may be uniformly arranged (e.g., in a desired pattern) on each panel 102, 104, 110, and 112, and each panel 102, 104, 110, and 112 may have the same arrangement of the holes 133. However, in other embodiments, an arrangement of the holes 133 on at least one panel 102, 104, 110, and 112 may be different from the rest of the panels 102, 104, 110, and 112.

The computer housing 100 may further include a top beveled portion 114 extending upwardly and rearwardly between the front panel 102 and the top panel 110. Specifically, the top beveled portion 114 may extend between and contact a top edge 103 of the front panel 102 and a front edge 111 of the top panel 110. The computer housing 100 also includes a bottom beveled portion 116 extending downwardly and rearwardly between the front panel 102 and the bottom panel 112. Specifically, the bottom beveled portion 116 may extend between and contact a bottom edge 101 of the front panel 102 and a front edge 113 of the bottom panel 112.

Similar to the top beveled portion 114 and the bottom beveled portion 116, the computer housing 100 may also include a top beveled portion 118 (hidden from view in FIG. 1A) extending between and contacting a top edge 105 of the rear panel 104 and a rear edge 109 of the top panel 110. The computer housing 100 also includes a bottom beveled portion 120 (hidden from view in FIG. 1A) extending between and contacting a bottom edge 107 of the rear panel 104 a rear edge 115 of the bottom panel 112.

The computer housing 100 may include a plurality of engagement members in each corner thereof. Depending on the location, the engagement members may be located either proximate the right panel 106 or the left panel 108. FIG. 1A shows the engagement members 122 and 124 in the computer housing 100 and FIG. 1B depicts a general location of the engagement members 122 and 124 in the computer housing as viewed in the direction of arrow A.

Referring to FIGS. 1A and 1B, an upper left top corner 150 of the computer housing 100 may include engagement members 122 and 124. The engagement member 122 is defined in the front panel 102 proximate the top edge 103 and proximate the left panel 108. The engagement member 124 is defined in the top beveled portion 114 proximate the left panel 108. The upper right top corner 152 of the computer housing 100 may similarly include the engagement member 122 defined in the front panel 102 proximate the top edge 103 and proximate the right panel 106 and the engagement member 124 in the top beveled portion 114 and proximate the right panel 106. The engagement members 124 in the corners 150 and 152 may be located generally midway between the top edge 103 and the front edge 111, or may be proximate either the top edge 103 or the front edge 111.

The lower left bottom corner 154 of the computer housing 100 may include the engagement member 122 in the bottom panel 112 proximate the front edge 113 and proximate the left panel 108 and the engagement member 124 in the bottom beveled portion 116 proximate the left panel 108. The lower right front corner 156 of the computer housing 100 may include the engagement member 122 (hidden in FIG. 1A) in the bottom panel 112 proximate the front edge 113 and proximate the right panel 106 and the engagement member 124 in the bottom beveled portion 116 proximate the left panel 108. The engagement members 124 in the corners 154 and 156 may be located generally midway between the bottom edge 101 and the front edge 113, or may be proximate to either the bottom edge 101 or the front edge 113.

The rear left top corner 158 may include the engagement member 122 in the top panel 110 proximate the rear edge 109 and proximate the left panel 108, and the engagement member 124 in the top beveled portion 118 and proximate the left panel 108. The engagement member 122 in the rear right top corner 160 may be located in the top panel 110 proximate the rear edge 109 and proximate the right panel 106, while the engagement member 124 (hidden from view in FIGS. 1A and 1B) may be located in the top beveled portion 118 and proximate the right panel 106. The engagement members 124 in the corners 158 and 160 may be located generally midway between the rear edge 109 and the top edge 105, or may be proximate to either the rear edge 109 or the top edge 105.

The rear left bottom corner 162 and the rear right bottom corner 164 (hidden from view in FIGS. 1A and 1B) may each include engagement member 122 and 124; further description thereof is omitted herein for the sake of brevity.

Distance x between each of the engagement members 122 and 124 may be the same. FIG. 1B illustrates the distance x between the engagement members 122 and 124 in the corners 150, 154, 158, and 162.

The computer housing 100 may include additional engagement members 142a 142b, 142c, and 142d (collectively referred to as engagement members 142) in the front panel 102. As illustrated in FIGS. 1A and 1B, the engagement members 142a and 142b may be located in a central portion of the front panel 102 and laterally opposite each other. The engagement member 142a may be proximate the left panel 108 and the engagement member 142b may be proximate the right panel 106. The engagement members 142c and 142d may be located proximate the bottom edge 101 in the front panel 102 and laterally opposite each other. The engagement member 142c may be proximate the left panel 108 and the engagement member 142b may be located proximate the right panel 106. Although not explicitly illustrated, panels 104, 110, and 112 may also include engagement members 142. The number of engagement members 142 on each panel 102, 104, 110, and 112 may be increased or decreased and the positions of the engagement members 142 may be varied according to design and application requirements, without departing from the scope of the disclosure.

Figure 1C:
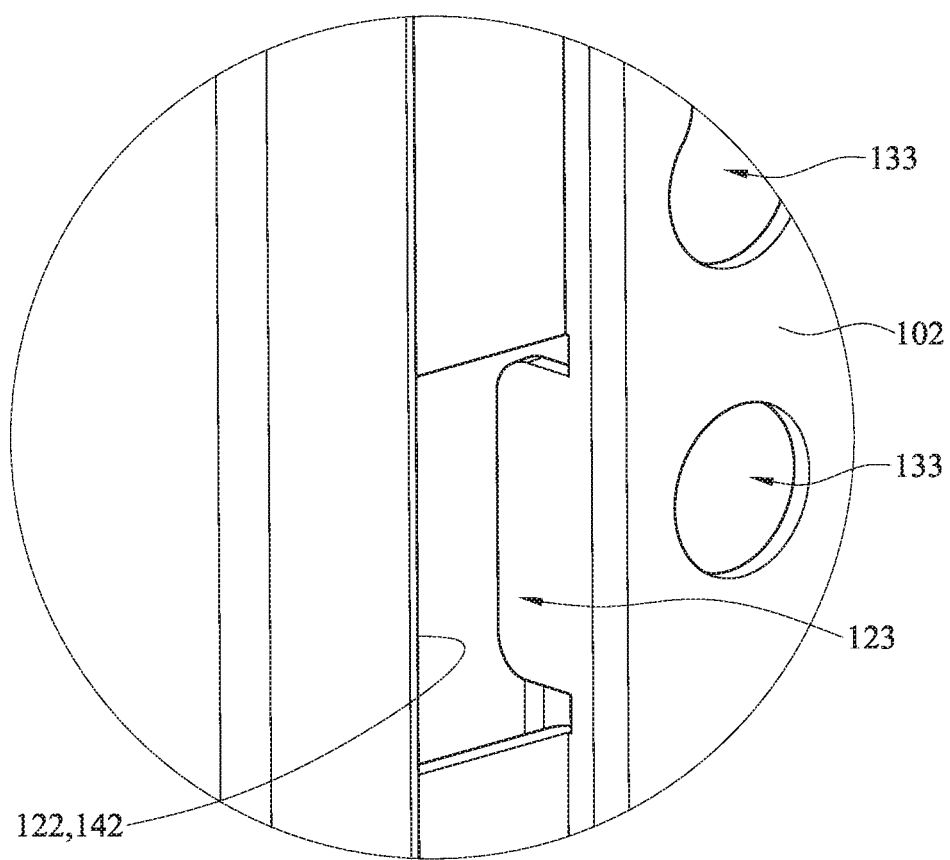
FIG. 1C illustrates a connection between an engagement member and the front panel of FIG. 1A in greater detail.

FIG. 1C illustrates a connection between an engagement member 122 (or 142) and the front panel 102 in greater detail. As illustrated, the front panel 102 includes a positioning portion 123 that is removably received in the corresponding engagement member 122 (or 142) to correctly position the front panel 102 on the computer housing 100. In an example, and as illustrated, the positioning portion 123 may be a projection or protrusion that extends from the front panel 102. However, in other examples, the front panel 102 may be non-removably secured to the computer housing 100 via the engagement member 122 (or 142). In still other examples, the positioning portion 123 may be a screw, rivet, etc. and the engagement member 122 (or 142) may be an opening that is correspondingly sized or otherwise configured to receive the positioning portion 123.

Figure 3A:
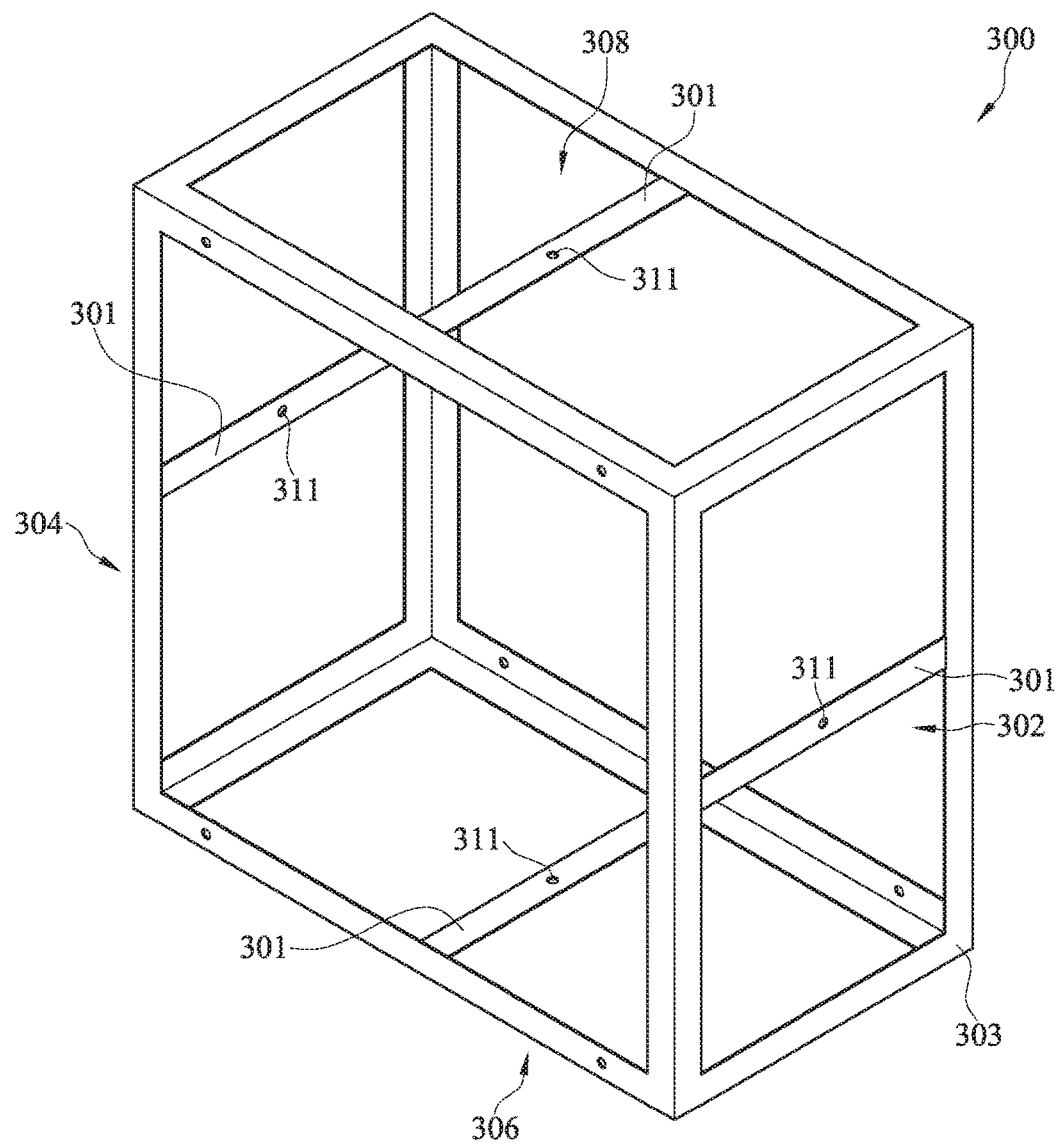
FIG. 3A is a left perspective view of the computer housing of FIG. 2A having connecting rods coupled thereto.

As illustrated, the positioning portion 123 may not entirely occupy the engagement member 122 when positioned therein. Some portion of the engagement member 122 may be unoccupied and may be used to removably install one or more user-customized panels on the front panel 102. As discussed below, the connection members 313 (FIG. 3C) may be positioned in the unoccupied portion of the engagement member 122 to removably install the user-customized panel 312 (FIG. 3C) and 323 (FIG. 3E). For instance, the connection members 313 and the engagement member 122 may engaged with each other using snap-fit connections or joints. The connection between an engagement member 142 and the front panel 102 is similar to the connection discussed above, and thus is omitted herein for the sake of brevity. Further, the panels 104, 110, and 112 may be coupled to the computer housing 100 in a similar manner discussed above, and an explanation thereof is omitted for the sake of brevity.

As discussed further below, each engagement member 122, 124, and 142 may be sized or otherwise configured to receive cover panels, decorative strips, handles, etc., for customizing the appearance of the computer housing 100. In an embodiment, the engagement members 122, 124, and 142 may be or include threaded holes, slots, notches, magnets, interlocking mechanisms, a combination thereof, and the like. The panels 102, 104, 106, 108, 110, and 112 may be plastic or metal (e.g., aluminum) sheets of a desired thickness.

Figure 2A:
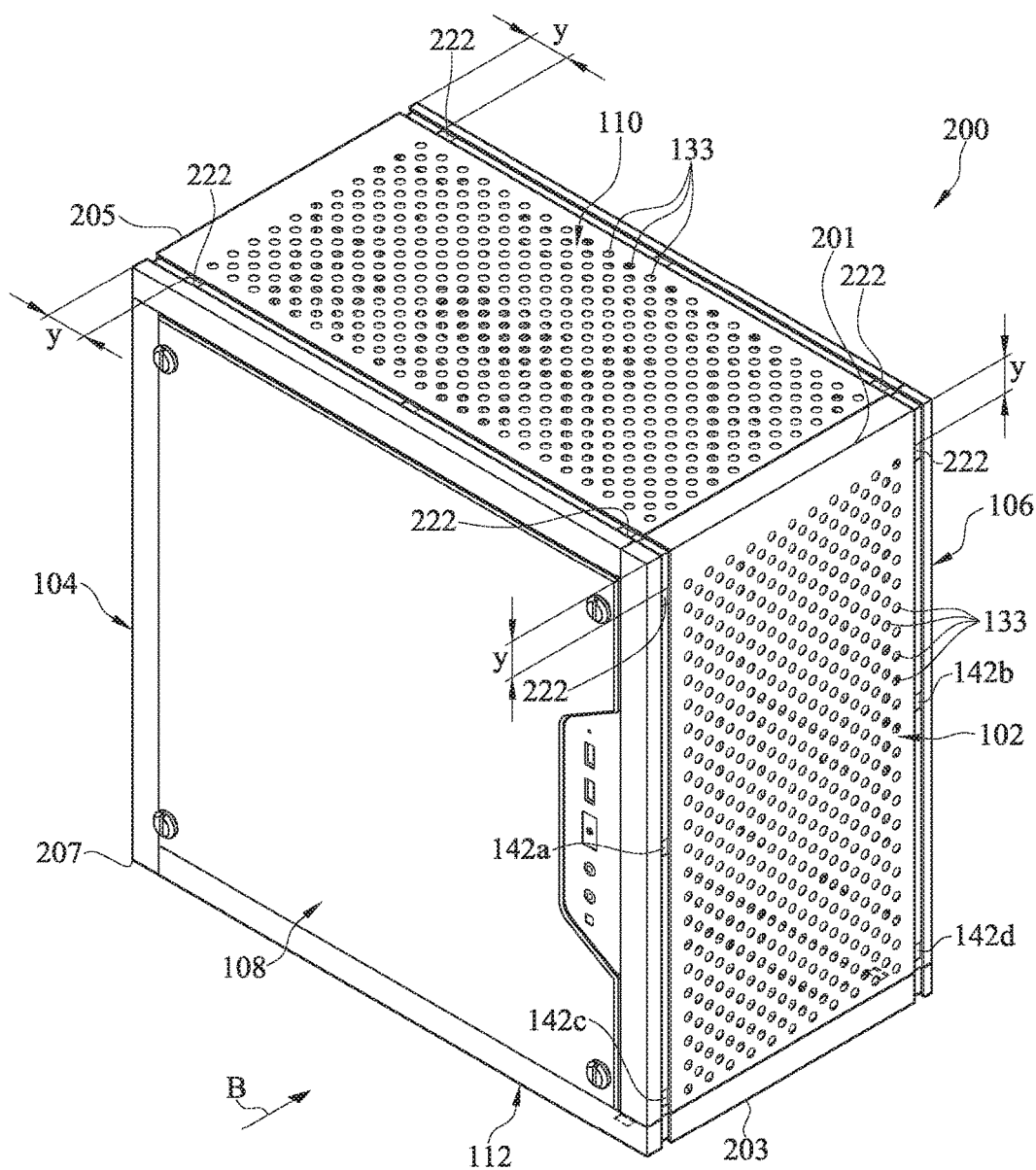
FIG. 2A is a left perspective view of a computer housing wherein the beveled portions are absent, according to disclosed embodiments.

In another embodiment, the beveled portions 114, 116, 118, and 120 may be absent. FIG. 2A illustrates a left perspective view of such a computer housing 200, according to disclosed embodiments. The computer housing 200 may be similar in some aspects to the computer housing 100 in FIGS. 1A and 1B above and may therefore be best understood with reference thereto where like numerals designate like steps not described again in detail. As illustrated, the front panel 102 may contact the top panel 110 at a front top edge 201 and the front panel 102 may contact the bottom panel 112 at a front bottom edge 203. Similarly, the top panel 110 may contact the rear panel 104 at a rear top edge 205 and the rear panel 104 may contact the bottom panel 112 at a rear bottom edge 207.

Figure 2B:
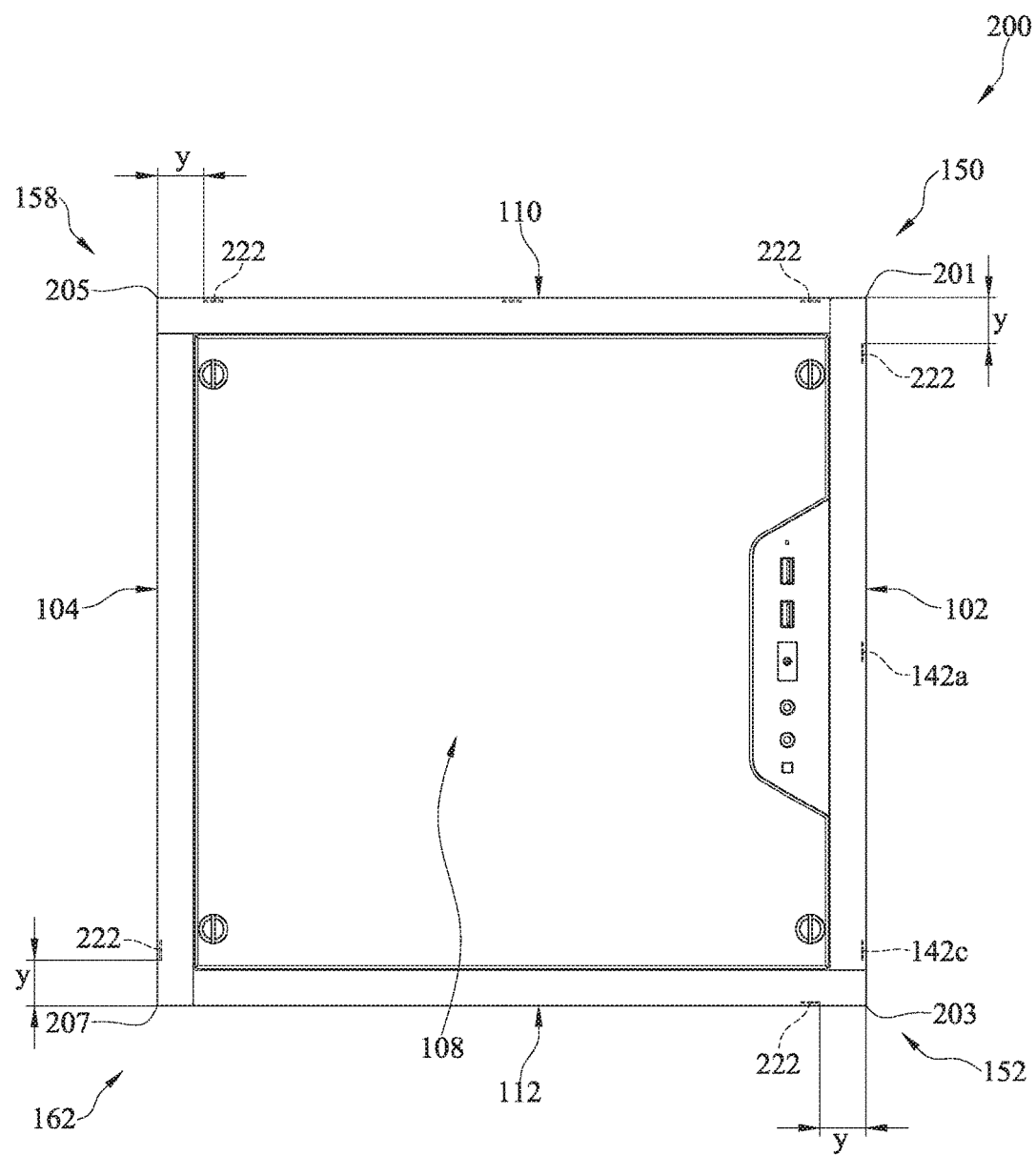
FIG. 2B is a left side view of the computer housing of FIG. 2A in the direction of the arrow B in FIG. 2A.

FIG. 2B illustrates a left side view of the computer housing 200 viewed in the direction of the arrow B in FIG. 2A, according to disclosed embodiments. Like FIG. 1B, FIG. 2B illustrates a general location of engagement members on the front, top, and bottom panels. Referring to FIG. 2B, with continued reference to FIG. 2A, two engagement members 222 may be defined on the front panel 102 each at a distance y from the front top edge 201. One engagement member 222 may be defined proximate the left panel 108 and the other engagement member 222 may be defined proximate the right panel 106. The top panel 110 may also include engagement members 222 each at a distance y from the rear top edge 205. As illustrated, the top panel 110 may also include one engagement member 222 defined proximate the left panel 108 and the other engagement member 222 defined proximate the right panel 106. The bottom panel 112 may similarly include engagement members 222 at a distance y from the front bottom edge 203, one proximate the left panel 108 (seen in FIG. 2B) and the other proximate the right panel 106. The rear panel 104 may also include engagement members 222 at a distance y from the rear bottom edge 207, one proximate the left panel 108 (seen in FIG. 2B) and the other proximate the right panel 106. All engagement members 222 may be disposed at a same distance y from the corresponding edges. In an embodiment, the engagement members 222 may be or include threaded holes, slots, notches, magnets, interlocking mechanisms, a combination thereof, and the like. As discussed further below, each engagement member 222 may be sized or otherwise configured to receive cover panels, decorative strips, handles, and the like.

In an embodiment, connecting rods may be coupled to the computer housings 100 and 200, and the front panel 102, the rear panel 104, the top panel 110, and the bottom panel 112 may be coupled to the connecting rods. FIG. 3A is a left perspective view of the computer housing 200 having connecting rods 301 coupled thereto. Although not illustrated, the computer housing 100 may also have a similar structure including the connecting rods 301, without departing from the scope of the disclosure.

For the sake of clarity, the front panel 102, the rear panel 104, the right panel 106, the left panel 108, the top panel 110, and bottom panel 112 are omitted from FIG. 3A. A connecting rod 301 may be coupled to each of a front side 302, a rear side 304, a bottom side 306, and a top side 308. The connecting rods 301 of the opposing sides (e.g., the front side 302 and the rear side 304) may be located at the same position.

In an embodiment, and as illustrated, the connecting rod 301 may be coupled in the central portion of the corresponding sides 302, 304, 306, and 308. However, the location of the connecting rod 301 is not limited thereto and the connecting rod 301 may be coupled at any location along the corresponding sides 302, 304, 306, and 308. In other embodiments, more than one connecting rod 301 may be coupled to one or more of the front side 302, the rear side 304, the bottom side 306, and the top side 308, without departing from the scope of the disclosure.

An engagement member 311 may be included in each connecting rod 301. In an example and as illustrated, the engagement member 311 may be located in a central portion of the connecting rod 301. However, embodiments are not limited thereto and the engagement member 311 can be at any location on the connecting rod 301, without departing from the scope of the disclosure. In an embodiment, the engagement member 311 may be or include threaded holes, slots, notches, magnets, interlocking mechanisms, a combination thereof, and the like. Each engagement member 311 may be sized or otherwise configured to removably receive the panels 102, 104, 110, and 112 that are mounted or otherwise installed on the sides 302, 304, 306, and 308. As used herein, the term "removably received" and variations thereof refer to the act of coupling (or assembling or installing) a first component on with a second component such that the first and second components may be later decoupled or disassembled with relative ease and without causing damage to the first and second components. For instance, the first component and the second component may be coupled using snap-fit connectors or joints such that the first and second components may be disassembled with relative ease. Similarly, the first and second components may be coupled via magnets having opposite polarities such that they "stick" to one another and coupled the first and second components to each other. Using adequate force that does not cause damage, the first and second components may be separated.

For instance, the front panel 102, the rear panel 104, the top panel 110, and the bottom panel 112 may include connection member(s) (e.g., screws, magnets, and the like) each corresponding to engagement member(s) 311 on the connecting rod(s) 301. When installing the panels 102, 104, 110, and 112, the connection member(s) may be received into the corresponding engagement member 311 and the panel may be removably mounted (e.g., snap-fit, coupled via magnets or removable screws, and the like), to the computer housing 200. Thus, by providing the connecting rod 301, a user may be able to install a variety of decorative panels on the computer housing 200 and thus change an appearance thereof. Further, as described below, by using the connecting rod 301, it may be possible to install more than one panel on a side of the computer housing 200.

Figure 3B:
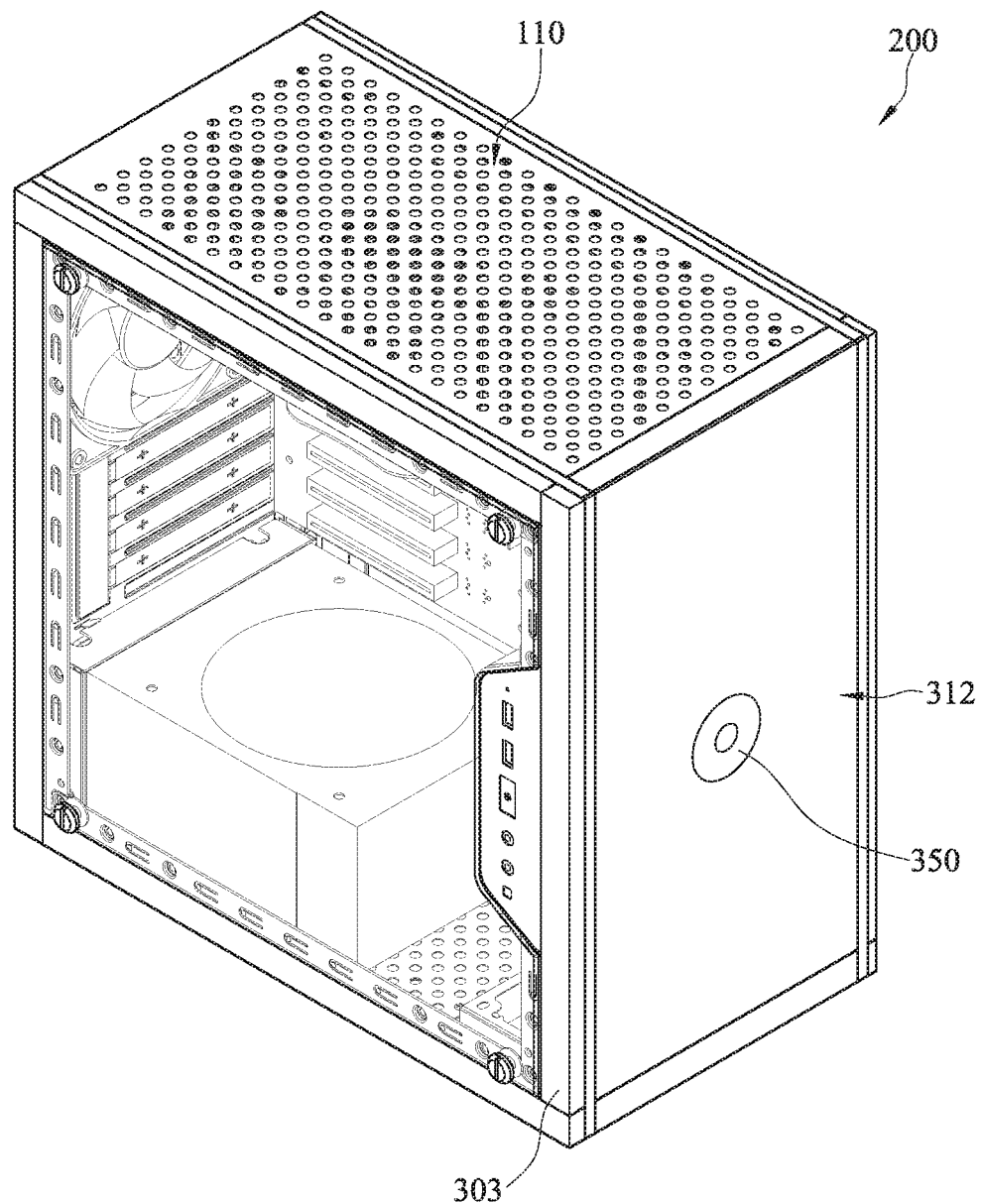
FIG. 3B shows the computer housing 200 of FIG. 2A having user-customized panels removably attached to the front panel and top panel, respectively, according to disclosed embodiments.

FIG. 3B shows the computer housing 200 having user-customized panel 312 removably attached to the front panel 102, respectively. However, it should be noted that the user-customized panel 312 may be removably attached to the top panel 110, the rear panel 104 and/or the bottom panel 112. In an example, and as illustrated in FIG. 3B, the panel 312 may have a company logo 350 or any other user-desired similar. In an example, the same user-customized panels may be coupled to the panels 102, 104, 110, and 112. However, in other examples, one or more different user-customized panels 312 (e.g., having different colors, designs, etc.) may be coupled to the panels 102, 104, 110, and 112, without departing from the scope of the disclosure.

Figure 3C:
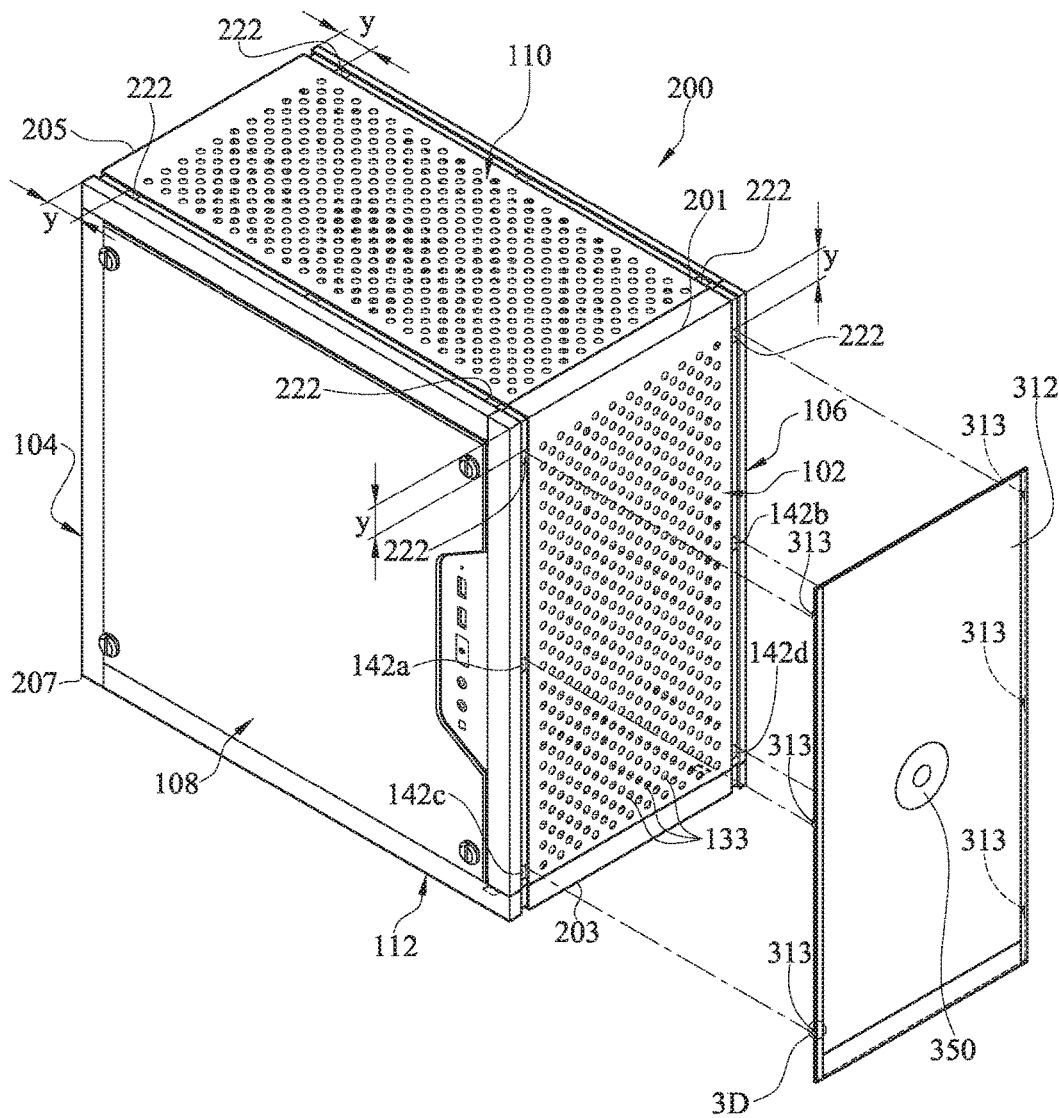
FIG. 3C illustrates the panel of FIG. 3B detached from the computer housing of FIG. 2A, according to disclosed embodiments.

FIG. 3C illustrates the panel 312 detached from the computer housing 200. As illustrated, the panel 312 includes connection members 313 each of which may be removably received into a corresponding engagement member 142 and 222 in the front panel 102. However, in other examples, the connection members 313 may be removably received into corresponding holes 133. Thus, the holes 133 may be sized or otherwise configured to removably receive and secure the connection members 313.

Figure 3D:
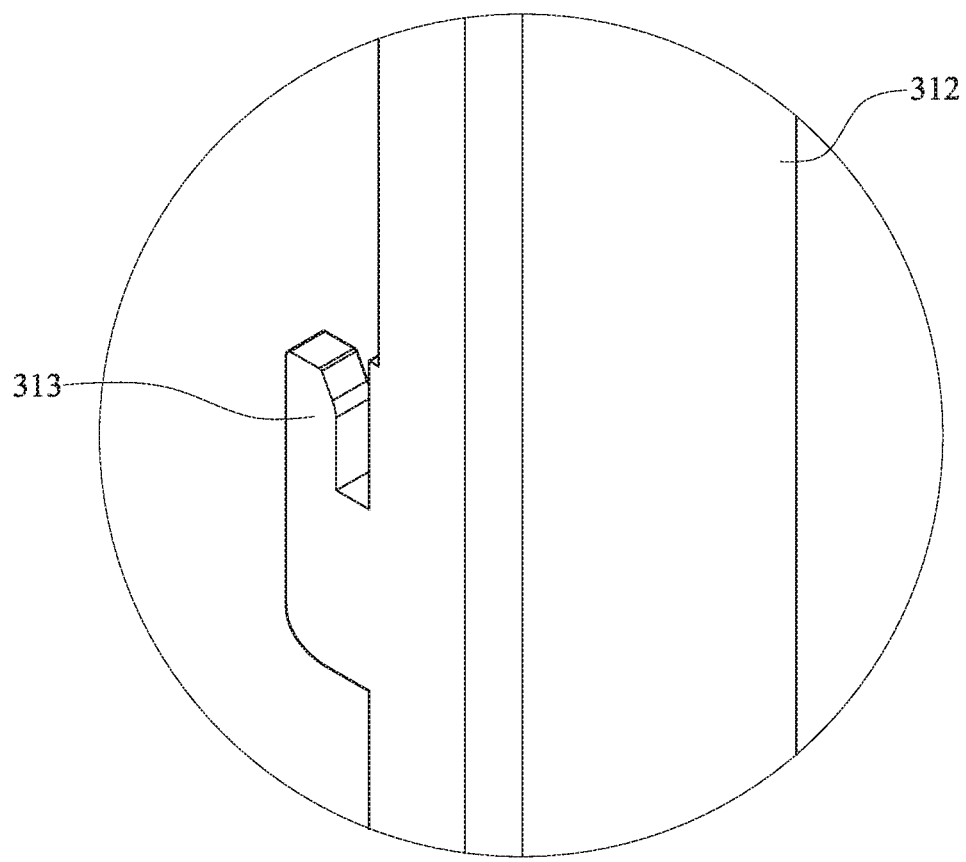
FIG. 3D illustrates a connection member of FIG. 3C in greater detail, according to disclosed embodiments.
Figure 3E:
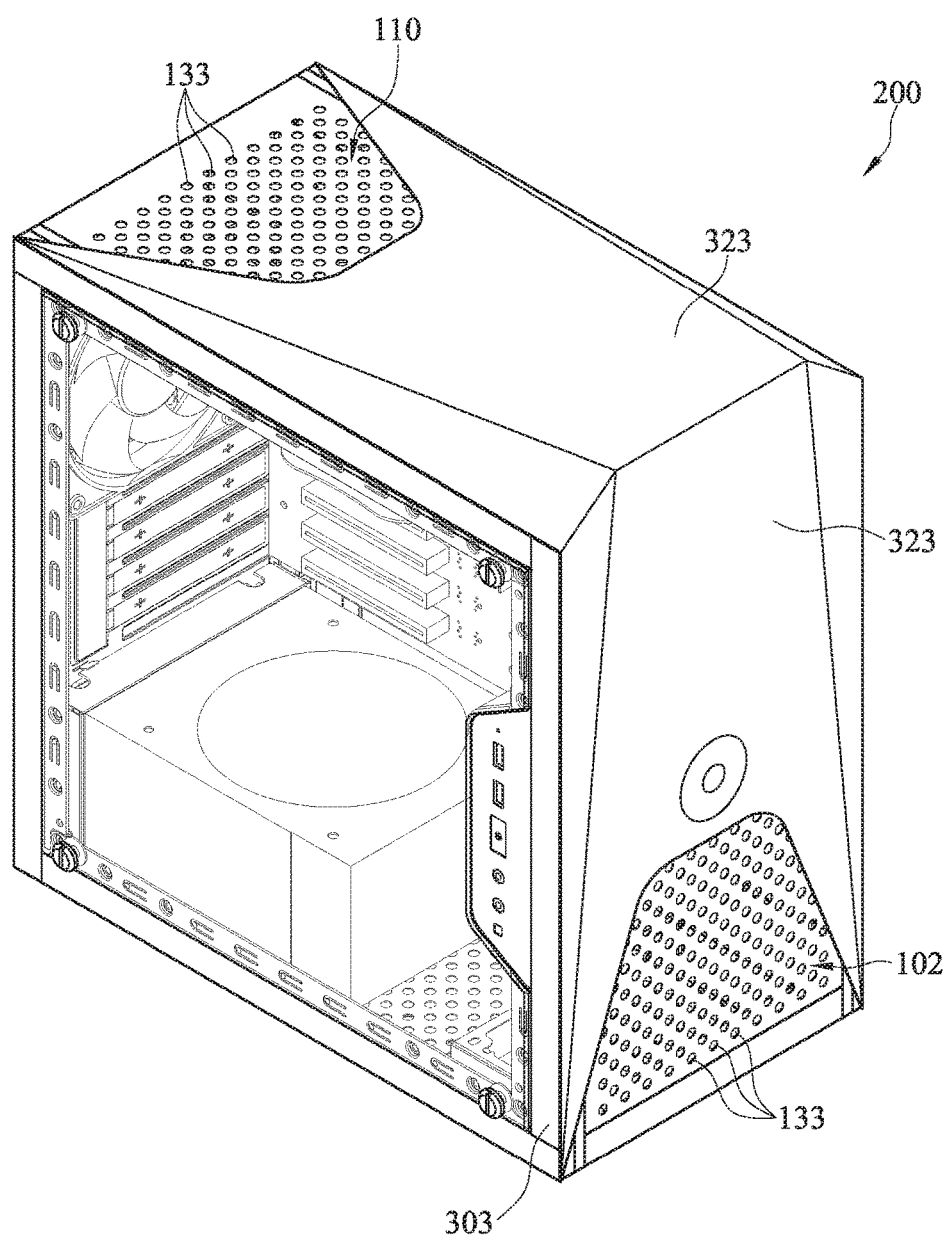
FIG. 3E show the computer housing of FIG. 2A having user-customized first panels each installed on the top panel and the front panel, according to disclosed embodiments.

FIG. 3D illustrates a connection member 313 in greater detail. In an example, and as illustrated, the connection member 313 may be shaped as a hook that is received in an engagement member 142 or 222 that is in the form of a slot. However, the shape and form of the connection member 313 and the engagement member 142 or 222 are not limited thereto. In other examples, the connection member 313 may be a screw and the engagement member 142 or 222 may be a threaded hole configured to receive the screw. In another example, the connection member 313 may be a magnet and the engagement member 142 or 222 may be a magnet having an opposite polarity such that the two magnets couple to each other when the panel 312 is installed. In examples where the connection members 313 are removably received into corresponding holes 133, the connection member 313 may be a screw (or some kind of hook or protrusion/projection) that is received into a corresponding hole 133 sized or otherwise configured to receive and secure the connection member 313. Thus, it will be understood that the connection member 313 and the engagement member 142, 222, and 133 are not limited to any particular coupling mechanism and may include a variety of coupling mechanisms for removably installing the user-customized panel 312 on the front panel 102.

FIG. 3E shows the computer housing 200 having user-customized panels 323 installed on the top panel 110 and the front panel 102. Additionally or alternatively, the user-customized panels 323 may be installed on the rear panel 104 and the bottom panel 112 or on only one of the panels 102, 104, 110, or 112. In an example, the panels 323 may be removably installed using the engagement members 142 and 222 (FIGS. 2A and 2B). For instance, the panels 323 may include connection member(s) 313 (FIG. 3D) that may be received into the engagement members 142 and 222. Additionally or alternatively, the panels 323 may be removably installed using connection members 313 that are received into one or more of the plurality of holes 133, as discussed above.

Although the embodiments illustrated in FIGS. 3A-3E are described with reference to the computer housing 200, disclosed embodiments are equally applicable to the computer housing 100 of FIGS. 1A-1B, without departing from the scope of the disclosure.

Figure 3F:
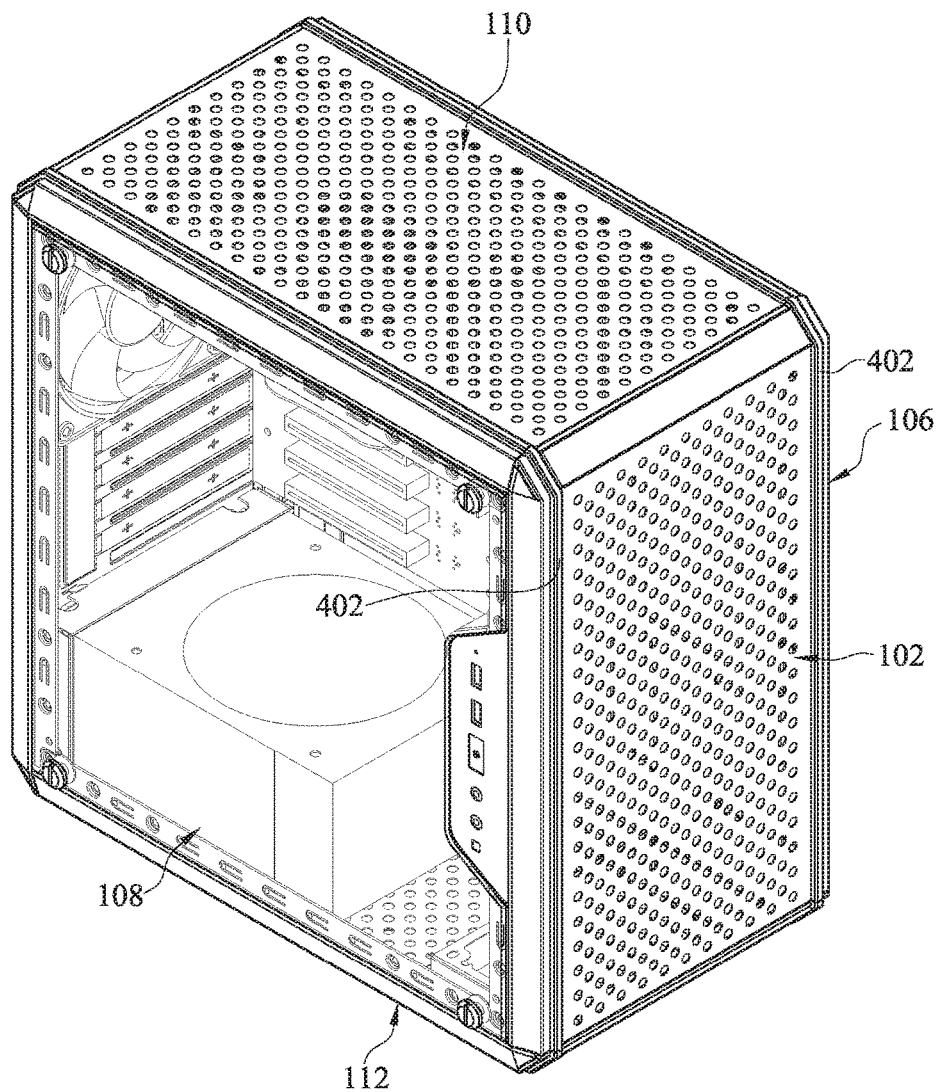
FIG. 3F shows the computer housing of FIG. 1A including decorative strips disposed on the front panel, the rear panel, the top panel, and the bottom panel, according to another disclosed embodiment.

In other embodiments, decorative strips may be coupled to the computer housings 100 and 200 to change the appearance thereof. FIG. 3F shows the computer housing 100 including decorative strips 402 disposed on the front panel 102, the rear panel 104, the top panel 110, and the bottom panel 112. The decorative strips 402 may be disposed proximate the left panel 108 (illustrated as at least partially transparent or translucent panel) and the right panel 106. The decorative strips 402 may have different colors and designs and may give an aesthetically pleasing appearance to the computer housing 100. The decorative strips 402 may be of plastic, metal, wood, rubber, or any other suitable material. The decorative strips 402 may be removably attached to the computer housing 100. Thus, a user may change the appearance of the computer housing 100 as desired with relative ease. The decorative strips 402 may be create friction between the computer housing 100 and a surface (e.g., table, desk, floor, etc.) on which the computer housing 100 rests. The friction minimizes accidental movement of the computer housing 100 and increases the stability of the computer housing 100. The decorative strips 402 may also function as a shock absorber to minimize the shock impulses generated when moving the computer housing 100 or placing the computer housing 100 on the surface.

Figure 3G:
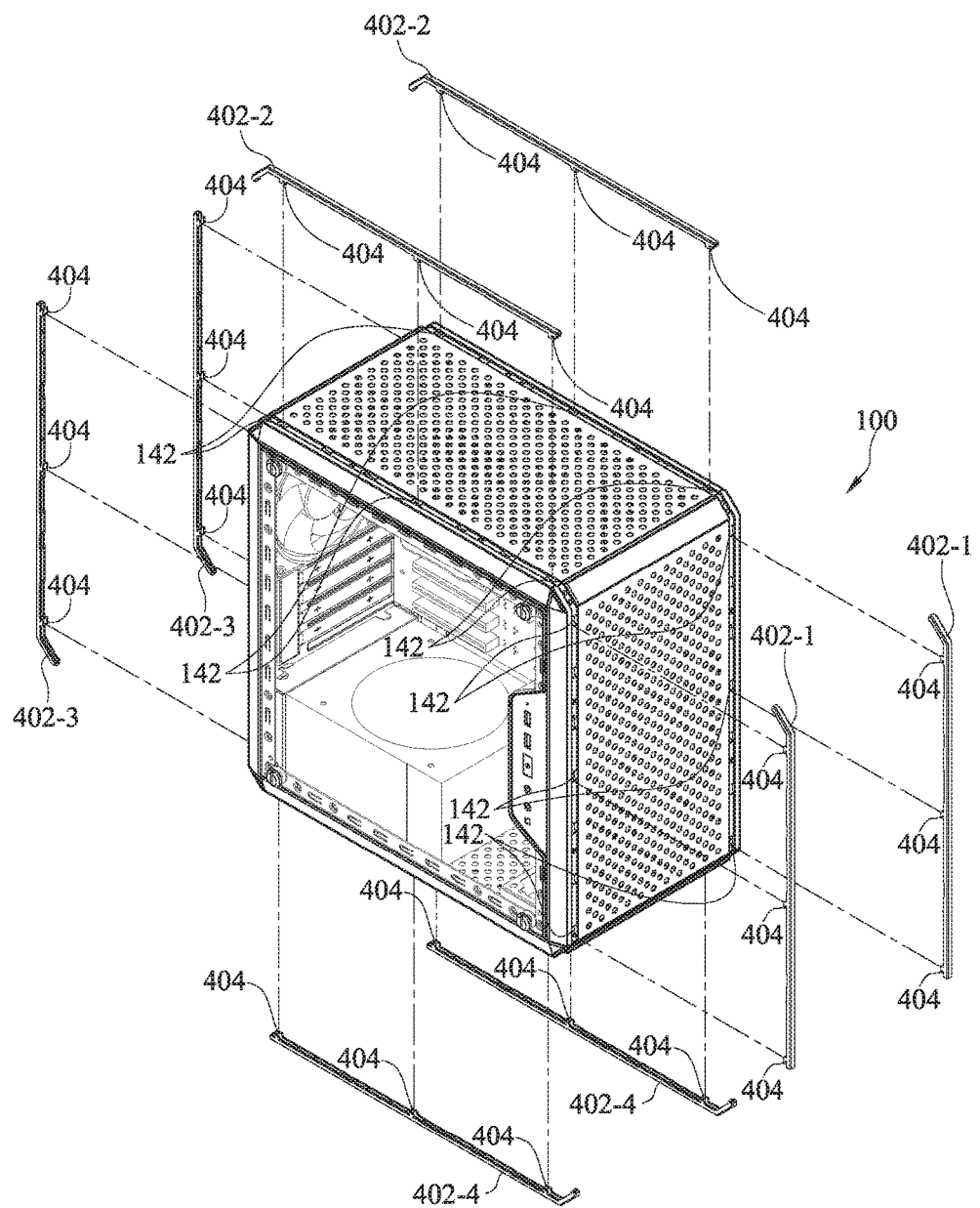
FIG. 3G shows the decorative strips of FIG. 3F disassembled from the computer housing of FIG. 1A, according to disclosed embodiments.

FIG. 3G shows the decorative strips 402 disassembled from the computer housing 100. In an example, and as illustrated, each decorative strip 402 may include a front part 402-1, a top part 402-2, a rear part 402-3, and a bottom part 402-4. Each of the front part 402-1, top part 402-2, rear part 402-3, and bottom part 402-4 may include connection members 404 that may be received in corresponding engagement members 142 in the front panel 102, the rear panel 104, the top panel 110, and the bottom panel 112 of the computer housing 100. Although the decorative strips 402 are described with reference to the computer housing 100, it will be understood that decorative strips can also be used with the computer housing 200, without departing from the scope of the disclosure.

Figure 3H:
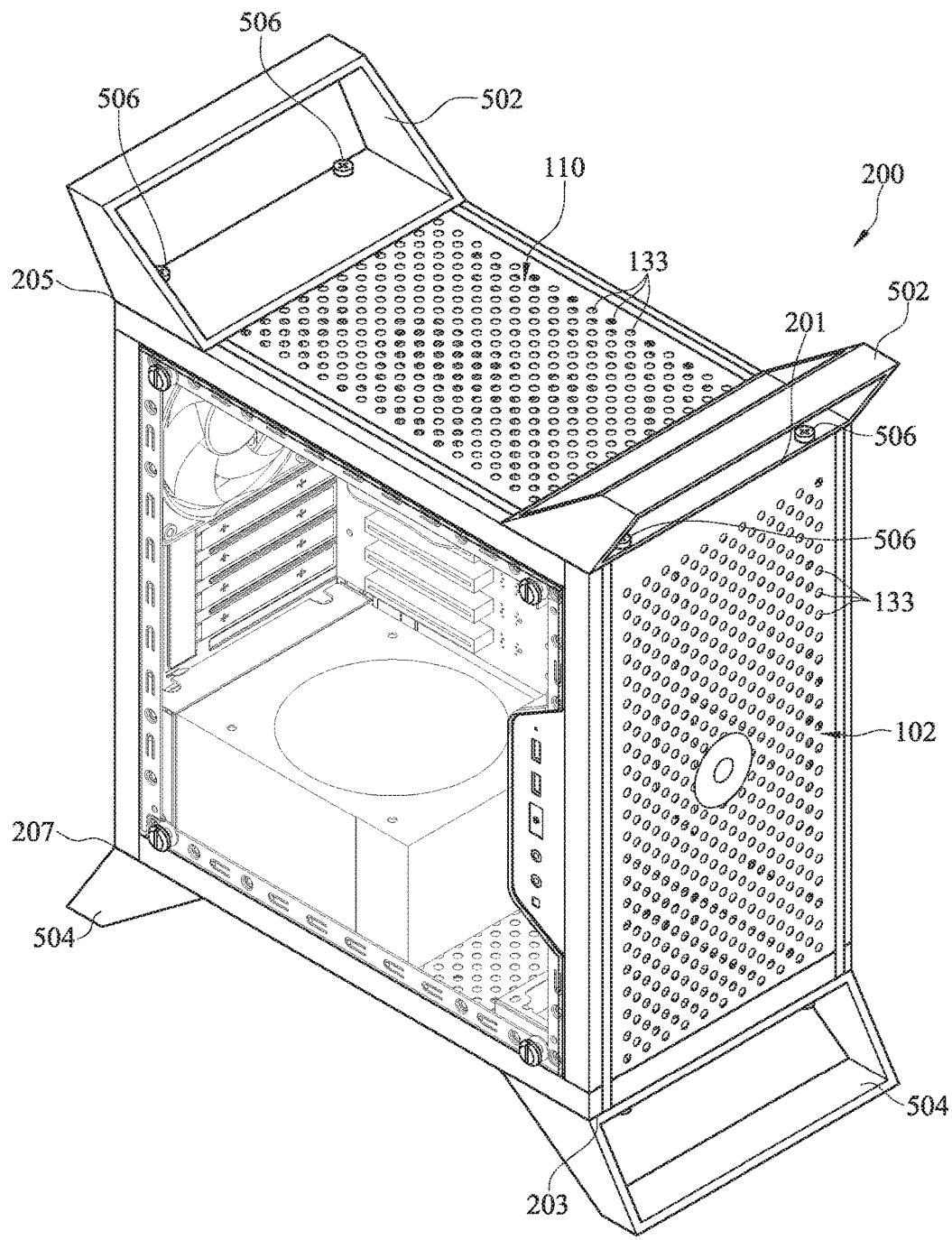
FIG. 3H is a perspective view of the computer housing of FIG. 2A having supporting members coupled thereto, according to disclosed embodiments.

In some embodiments, supporting members may be coupled to the computer housings 100 and 200. The supporting members may support the computer housings 100 and 200, and permit easy movement and transportation of the computer housings 100 and 200. FIG. 3H is a perspective view of the computer housing 200 having supporting members coupled thereto, according to disclosed embodiments. The supporting members may include handles 502 and supports 504 and may both have a substantial similar structure. The supporting members may be distinguished as handles 502 or supports 504 based on the positions thereof on the computer housing 200. As illustrated, a handle 502 may be coupled to the computer housing 200 proximate the front top edge 201 and/or the rear top edge 205, and a support 504 may be coupled to the computer housing 200 proximate the front bottom edge 203 and/or the rear bottom edge 207.

The handles 502 may be coupled to the top panel 110 of the computer housing 200 or directly to the top side 308 of the computer housing 200 in case the top panel 110 is absent. Similarly, the supports 504 may be coupled to the bottom panel 112 of the computer housing 200 or directly to the bottom side 306 of the computer housing 200 in case the bottom panel 112 is absent. The handles 502 and the supports 504 may be coupled using fasteners 506 (screws, bolts, etc.) that are received in the engagement portions 222 and/or in one or more of the plurality of holes 133.

The handles 502 and the supports 504 may have various colors and designs and may give the computer housing 200 an aesthetically pleasing appearance. The handles 502 and the supports 504 may be of plastic, metal, wood, rubber, or any other suitable material, and may be removably attached to the computer housing 200. The supports 504 may create friction between the computer housing 200 and a surface (e.g., table, desk, floor, etc.) on which the computer housing 200 is placed. The friction minimizes accidental movement of the computer housing 200 and increases the stability of the computer housing 200. The supports 504 may also function as a shock absorber to minimize the shock impulses generated when the computer housing 200 is moved or otherwise displaced.

Figure 3I:
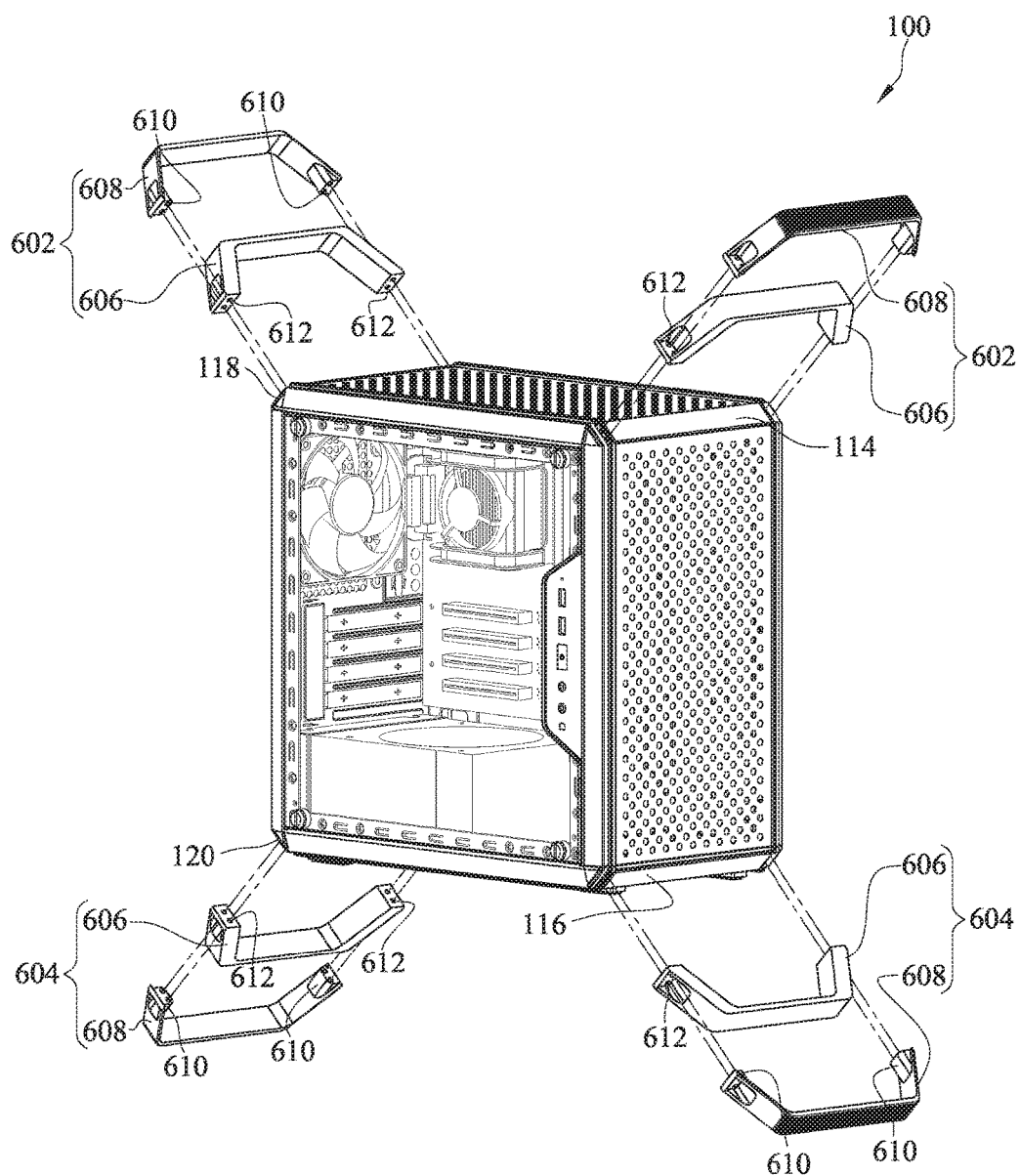
FIG. 3I is a perspective view of the computer housing of FIGS. 1A and 1B having supporting members including handles and supports coupled thereto, according to disclosed embodiments.

FIG. 3I is a perspective view of the computer housing 100 of FIGS. 1A and 1B having supporting members including handles 602 and supports 604 coupled thereto, according to disclosed embodiments. The handles 602 and supports 604 may both have a substantial similar structure and may be distinguished as handles 602 or supports 604 based on the positions thereof on the computer housing 100.

As shown in the exploded view, each handle 602 and support 604 may include a body 606 removably attached to the computer housing 100 and a cover 608 removably attached to the body 606. More specifically, a handle 602 may be removably attached to each of the beveled portions 114 and 118 via the engagement members 124, and a support 604 may be removably attached to each of the beveled portions 116 and 120 via the engagement members 124. The cover 608 may include connection members 610 that may pass through openings 612 in the body 606 and are then received in the engagement members 124 when the handles 602 and supports 604 are coupled to the corresponding beveled portions 114, 116, 118, and 120. Alternatively, the body 606 may be secured to the computer housing 100 using fasteners such as screws, bolts, etc., and the cover 608 may be removably coupled to the body 606.

The body 606 and cover 608 may have various colors and designs and may give the computer housing 100 an aesthetically pleasing appearance. The body 606 and the cover 608 may be of plastic, metal, wood, rubber, or any other suitable material. The supports 604 may create friction between the computer housing 100 and a surface to minimize accidental movement of the computer housing 100 and increase the stability of the computer housing 100. The supports 604 may also function as a shock absorber to minimize the shock impulses generated when the computer housing 100 is moved or otherwise displaced.

In an embodiment, one or both of the left panel 108 and the right panel 106 computer housings 100 and 200 may at least in part be transparent or translucent. For example, a transparent left panel 108 is illustrated in FIGS. 3B, 3C, 3D, 3E, 3F, and 3G. The transparent or translucent panels 106 and 108 may also give an aesthetically pleasing appearance.

Figure 3J:
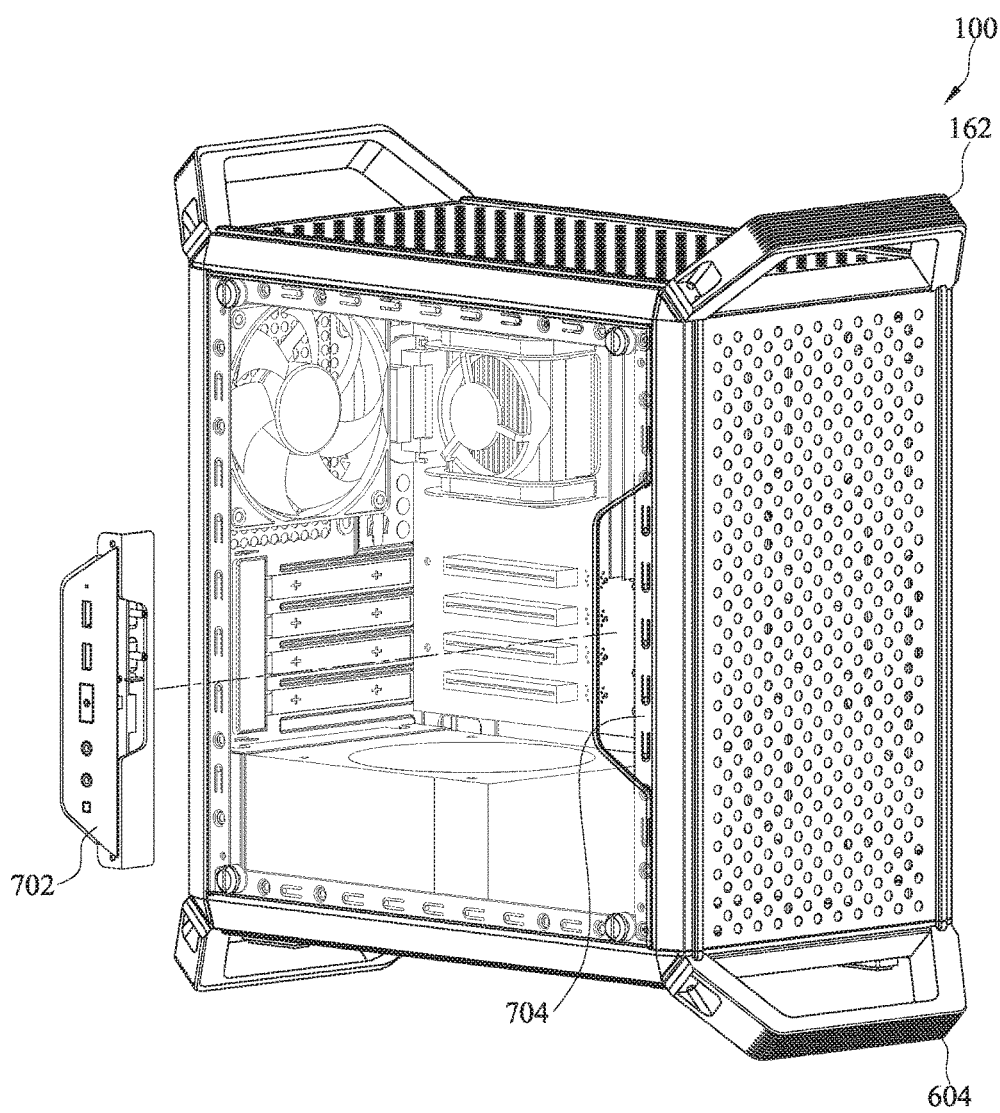
FIG. 3J is a perspective view of the computer housing of FIG. 1A having an input/output (I/O) box coupled to the left side thereof, according to disclosed embodiments.

In an embodiment, an input/output (I/O) box may be coupled to the left side or right side of the computer housings 100 and 200. FIG. 3J is a perspective view of the computer housing 100 having an I/O box 702 coupled to the left side thereof. For instance, the I/O box 702 may be coupled to the left supporting column 704 of the computer housing 100. When the I/O box 702 is coupled to the computer housing 100 or 200, the left panel 108 or the right panel 106 may define a cut-out or opening having a shape and size that conforms to the shape and size of the I/O box 702 (or more specifically, to the shape and size of the outer surfaces of the I/O box 702) in order to accommodate the I/O box 702.

Figure 3K:
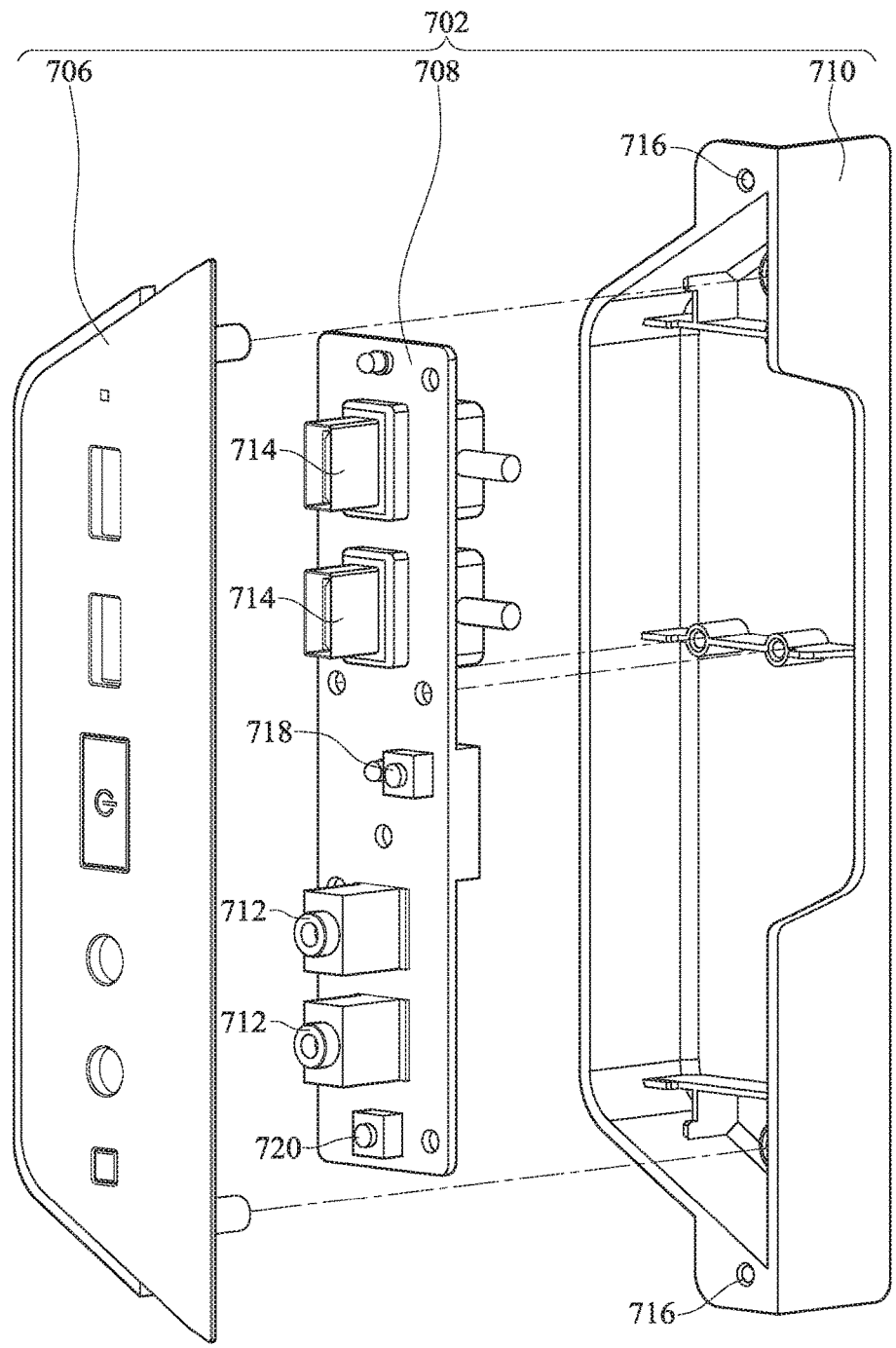
FIG. 3K is an exploded view of the I/O box of FIG. 3J, according to disclosed embodiments.

FIG. 3K is an exploded view of the I/O box 702, according to disclosed embodiments. The I/O box 702 may include an I/O top cover 706, a printed circuit board (PCB) 708, and an I/O bottom cover 710. The PCB 708 include standard connectors for 3.5 mm audio jacks 712 for connecting headphones, microphones, and other supporting devices, USB connectors 714 for connecting USB devices, power button 718, and reset button 720. The PCB 708 is received in the I/O bottom cover 710 and the I/O top cover 706 is secured to the I/O bottom cover 710. The I/O box 702 may be coupled to the computer housing 100 using fasteners, such as screws, bolts, etc., that are placed in the openings 716 of the I/O bottom cover 710 and received in corresponding openings in the computer housing 100.

Figure 4:
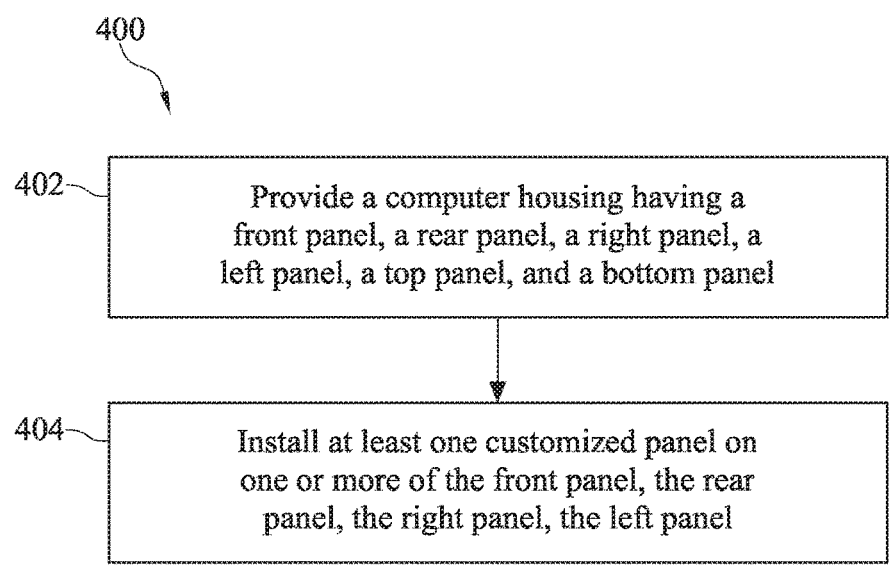
FIG. 4 is a flowchart of a method for customizing a computer housing, according to disclosed embodiments.

FIG. 4 is a flowchart of a method 400 of customizing a computer housing, according to disclosed embodiments. The method 400 includes providing a computer housing having a front panel, a rear panel, a right panel, a left panel, a top panel, and a bottom panel, as at 402. Each of the front panel, the rear panel, the top panel, the bottom panel may include a plurality of holes arranged therein. Each of the front panel, the rear panel, the top panel, the bottom panel may have the same arrangement of the holes or an arrangement of the holes on at least one panel may be different from the rest of the panels. Each of the front panel, the rear panel, the top panel, and the bottom panel may include one or more engagement members. The method 400 further includes installing at least one customized panel on one or more of the front panel, the rear panel, the top panel, the bottom panel, as at 404. The at least one customized panel may include one or more connection members, each of which is received in a corresponding engagement member.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A computer housing, comprising:
a plurality of panels including a front panel, a top panel, a rear panel, a bottom panel, a left panel, and a right panel coupled together to form the computer housing;
a beveled portion disposed between at least one of (i) the front panel and the top panel, (ii) the top panel and the rear panel, (iii) the rear panel and the bottom panel, and (iv) the bottom panel and the front panel; and
at least two engagement members disposed in each corner of the computer housing, wherein
one engagement member of the at least two engagement members is disposed in the beveled portion,
the other engagement member of the at least two engagement members is disposed in one of the front panel, the top panel, the rear panel, or the bottom panel,
the front panel, the top panel, the rear panel, or the bottom panel at least partially define the other engagement member of the at least two engagement members, and
the at least two engagement members are disposed at a same distance from each other in each corner.

2. The computer housing of claim 1, further comprising a supporting member removably attached to each beveled portion through the engagement member disposed therein.

3. The computer housing of claim 2, wherein each supporting member includes a body removably attached to the beveled portion, and a cover removably attached to the body.

4. The computer housing of claim 1, further comprising a connecting rod coupled to each of a front side, a top side, a rear side, a bottom side of the computer housing, wherein at least the front panel, the top panel, the rear panel, and the bottom panel are removably attached to the connecting rod on a corresponding side of the computer housing.

5. The computer housing of claim 1, further comprising a plurality of strips removably attached to one or more of the front panel, the top panel, the rear panel, and the bottom panel, wherein each strip is attached proximate either the left panel or the right panel.

6. The computer housing of claim 1, wherein at least one panel of the front panel, the top panel, the rear panel, and the bottom panel is different from the remaining panels.

7. The computer housing of claim 1, wherein the front panel, the top panel, the rear panel, and the bottom panel are same.

8. The computer housing of claim 1, wherein at least two of the front panel, the top panel, the rear panel, the bottom panel have a same shape and size, and each of the front panel, the top panel, the rear panel, the bottom panel include a plurality of holes.

9. The computer housing of claim 8, wherein an arrangement of the plurality of holes on each of the front panel, the top panel, the rear panel, the bottom panel is same.

10. The computer housing of claim 8, wherein an arrangement of the plurality of holes on one of the front panel, the top panel, the rear panel, and the bottom panel is different from at least one other of the front panel, the top panel, the rear panel, and the bottom panel.

11. The computer housing of claim 1, further comprising at least one customized panel removably attached to one or more of the front panel, the top panel, the rear panel, and the bottom panel via the engagement member disposed therein, wherein the engagement member is configured to receive a connection member included in the at least one customized panel.

12. The computer housing of claim 1, wherein each of the front panel, the top panel, the rear panel, and the bottom panel includes one or more engagement members located at a same position on each of the front panel, the top panel, the rear panel, and the bottom panel.

13. A computer housing, comprising:
a plurality of panels including a front panel, a top panel, a rear panel, a bottom panel, a left panel, and a right panel coupled to each other to form the computer housing,
wherein at least one of (i) the front panel and the top panel, (ii) the top panel and the rear panel, (iii) the rear panel and the bottom panel, and (iv) the bottom panel and the front panel define an edge of the computer housing therebetween, and
wherein each of the front panel, the top panel, the rear panel, the bottom panel include a plurality of holes;
at least two engagement members disposed on each of the front panel, the top panel, the rear panel, and the bottom panel, wherein
each engagement member is disposed at a same distance from a corresponding edge, and
at least one engagement member of the at least two engagement members is at least partially defined by the corresponding one of the front panel, the top panel, the rear panel, and the bottom panel; and
a connecting rod coupled to each of a front side, a top side, a rear side, a bottom side of the computer housing, wherein the connecting rods are coupled between two adjacent edges and separated from the two adjacent edges.

14. The computer housing of claim 13, further comprising a supporting member removably attached on the top panel and the bottom panel, and proximate at least one edge.

15. The computer housing of claim 13, wherein at least one of the front panel, the top panel, the rear panel, and the bottom panel is removably attached to the connecting rod on a corresponding side of the computer housing.

16. The computer housing of claim 13, wherein at least one panel of the front panel, the top panel, the rear panel, and the bottom panel is different from the remaining panels.

17. The computer housing of claim 13, wherein the front panel, the top panel, the rear panel, and the bottom panel are same.

18. The computer housing of claim 13, further comprising a plurality of strips removably attached to one or more of the front panel, the top panel, the rear panel, and the bottom panel, wherein each strip is attached proximate either the left panel or the right panel.

19. The computer housing of claim 13, wherein at least one of the left panel and the right panel is at least partially transparent or translucent.

20. A computer housing, comprising:
a plurality of panels including a front panel, a top panel, a rear panel, a bottom panel, a left panel, and a right panel coupled together to form the computer housing;
a plurality of engagement members disposed in the front panel, the top panel, the rear panel, and the bottom panel,
wherein the engagement members are at least partially defined by the corresponding front panel, the top panel, the rear panel, and the bottom panel;
a plurality of holes included in each of the front panel, the top panel, the rear panel, and the bottom panel; and
at least one customized panel including a connection member and being removably attached to one or more of the front panel, the top panel, the rear panel, and the bottom panel, wherein the one or more of the plurality of holes are configured to removably receive the connection member.

21. The computer housing of claim 20, further comprising:
a beveled portion disposed between at least one of (i) the front panel and the top panel, (ii) the top panel and the rear panel, (iii) the rear panel and the bottom panel, and (iv) the bottom panel and the front panel; and
a supporting member removably attached to at least one beveled portion.

22. The computer housing of claim 20, further comprising a supporting member removably attached to at least one of the front panel, the top panel, the rear panel, and the bottom panel via at least one of the (i) one or more of the plurality of engagement members, and (ii) one or more of the plurality of holes included therein.

23. A method of customizing a computer housing, comprising:
providing a computer housing having a front panel, a rear panel, a right panel, a left panel, a top panel, and a bottom panel, wherein
each of the front panel, the rear panel, the top panel, the bottom panel includes a plurality of holes arranged therein,
each of the front panel, the rear panel, the top panel, and the right panel includes one or more engagement members,
and at least one engagement member is at least partially defined by the corresponding one of the front panel, the rear panel, the top panel, and the right panel; and
installing at least one customized panel on one or more of the front panel, the rear panel, the top panel, the bottom panel.

24. The method of claim 23, wherein installing the at least one customized panel further comprises installing the at least one customized panel having one or more connection members, each connection member being received in a corresponding engagement member.

* * * * *